United States Patent Office 3,511,860
Patented May 12, 1970

3,511,860
SYNTHESIS OF 19-NOR AND RING A AROMATIC STEROIDS AND INTERMEDIATES THEREFOR
Francisco Alvarez, Sunnyvale, Calif., assignor to Syntex Corporation, Panama, Panama, a corporation of Panama
No Drawing. Continuation-in-part of application Ser. No. 581,707, Sept. 26, 1966. This application June 12, 1967, Ser. No. 645,526
Int. Cl. C07c *169/20, 169/32*
U.S. Cl. 260—397.3                          37 Claims

ABSTRACT OF THE DISCLOSURE

Synthesis of 19-nor steroids and aromatic A-ring steroids and novel intermediates therefor.

This is a continuation-in-part of application Ser. No. 581,707, filed Sept. 26, 1966, now abandoned.

This invention relates to novel processes for the preparation of 19-nor steroids and intermediates therefor.

More particularly, this invention relates to improved processes for the preparation of $\Delta^{5(10)}$-19-nor steroids, $\Delta^4$-19-nor steroids, and ring A aromatic steroids and valuable intermediates therefor. The 19-nor steroids and ring A aromatic steroids prepared according to the present invention are valuable therapetutic agents per se or useful intermediates for the preparation of other therapeutic agents.

Prior to the present invent, one valuable route for the preparation of 19-nor steroids involved the treatment of a 19-hydroxy-$\Delta^5$ steroid with lead tetraacetate to form the 6-acetoxy-$\Delta^{5(10)}$ steroid followed by removal of the 6-acetoxy group, oxidation, and isomerization of the $\Delta^{5(10)}$ steroid, if desired, to the $\Delta^4$ steroid, see U.S. Pat. 3,270,007. Removal of the 6-acetoxy group by treatment with palladium-on-charcoal while furnishing high yields fails to give clean and consistently reproducible results as a result of catalyst poisoning. In addition, the subsequent step of oxidation of the 3$\beta$-hydroxy group to the corresponding 3-keto compound, with or without migration of the $\Delta^{5(10)}$ double bond to the $\Delta^4$ double bond, is hampered by excessive formation of oxidative side products, presumably products oxidized in the activated 4-position. Routes to avoid this through halohydrogenation or dihalogenation of the $\Delta^{5(10)}$ double bond are successful in preventing excessive side reaction oxidation, but suffer from excessive A-ring aromatization during removal of the double bond protecting groups.

A primary object of the present invention is to provide syntheses for the production of 19-nor steroids which overcome the aforementioned disadvantages. Another object of the present invention is to provide novel and versatile intermediates for the production of 19-nor steroids and ring-A aromatic steroids. Other objects of the present invention will become apparent as the invention is hereinafter described in detail and from the appended claims.

The syntheses of 19-nor steroids in accordance with the present invention can be outlined as follows wherein, for brevity and simplicity, only the A and B ring of the steroid are shown and R represents hydrogen or a lower hydrocarbon carboxylic acyl group, Ac represents a lower hydrocarbon carboxylic acyl group, each of R' and R" represents hydrogen or a lower hydrocarbon carboxylic acyl group R' being hydrogen when R" is an acyl group and R" being hydrogen when R' is an acyl group and the wavy ($\xi$) line represents alpha or beta configuration or a mixture of the alpha and beta isomers. The expression "lower hydrocarbon carboxylic acyl" refers to carboxylic acyl groups of up to about 6 carbon atoms such as acetyl, propionyl, butyryl, and the like, preferably acetyl.

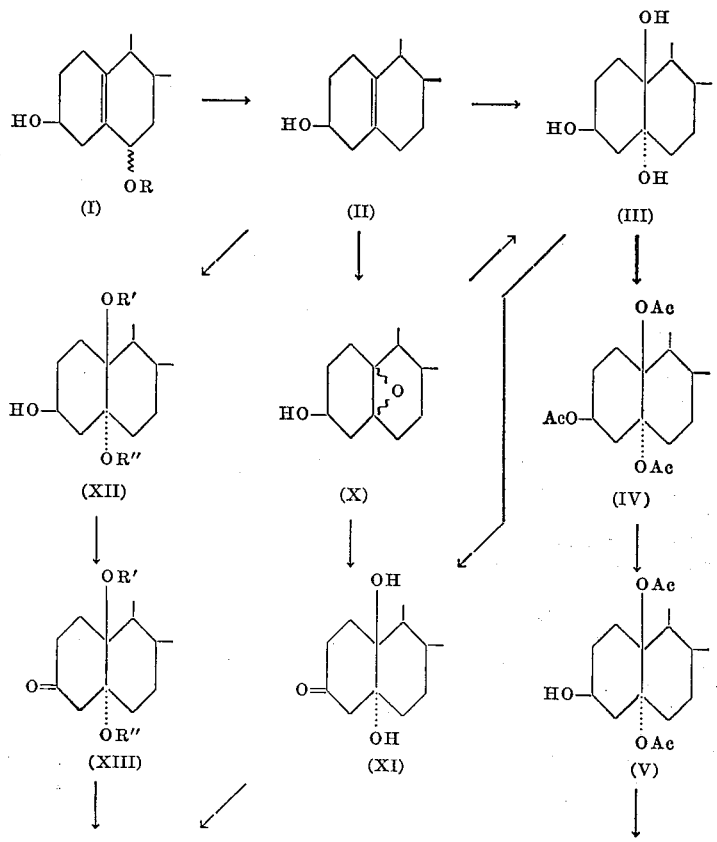

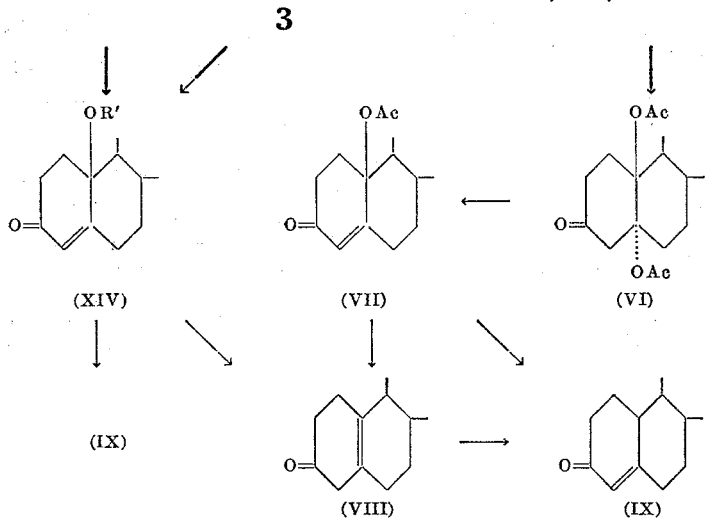

In the practice of the above outlined syntheses for the production of 19-nor steroids, a 3β-hydroxy-Δ$^{5(10)}$ steroid substituted at C–6 with a hydroxy or lower hydrocarbon carboxylic acyloxy group of Formula I is treated with Raney nickel in a lower monohydric alcohol containing from 2 to 6 carbon atoms such as ethanol, isopropanol, and the like to eliminate the C–6 substituent to furnish a Δ$^{5(10)}$ steroid of Formula II. This reaction can be conducted at room temperature or lower but generally is carried out at elevated temperatures such as the reflux temperature of the alcohol reaction mixture. The reaction time is not critical and largely depends on the reaction temperature. Generally, a reaction time of from about 30 minutes to about 48 hours is used depending upon the temperature, e.g. under reflux a reaction time of about 30 minutes to about 6 hours is generally used. The amount of Raney nickel employed in the reaction can vary considerably. Generally, on a weight basis, an amount of wet Raney nickel cake about double or more of the weight of the Δ$^{5(10)}$ steroid is employed. The concentration of the reaction mixture can be varied. As a guide, a ratio of alcohol to steroid starting material of about 10 to 1, vol. to weight, is generally used. When, for example, the C–6 substituted Δ$^{5(10)}$ steroid of Formula I is a 6-lower acyloxy substituted steroid obtained by the reaction of a 19-hydroxy-Δ$^5$ steroid with a lead tetracylate, e.g. lead tetra-acetate, the crude oily reaction product can be treated directly with Raney nickel according to the process of this invention. Surprisingly, side products in the lead tetracylate reaction and the present in the crude reaction product do not substantially affect the efficiency of this transformation and provides the Δ$^{5(10)}$ steroid of Formula II is essentially quantitative yield.

A Δ$^{5(10)}$ steroid of Formula II is then treated with a peracid such as perbenzoic acid, peracetic acid, m-chloroperbenzoic acid, and the like and depending upon the reaction conditions employed a steroid of either Formula III, X or XII is obtained.

In the preparation of 19-nor steroids utilizing the reaction route outlined above of II–III–IV–V–VI–VII–VIII or IX, the reaction of a Δ$^{5(10)}$ steroid of Formula II with peracid is conducted in an aqueous acidic medium resulting in the formation of the novel 3β,5α,10β-trihydroxy steroid III, a highly valuable intermediate having ideal proporties for isolation, purification and further chemical transformations. This reaction is carried out using about one molar equivalent of a peracid, e.g. one of the peracids set out above, preferably slightly more than one molar equivalent is used, in the presence of an aqueous acid, e.g. aqueous acetic acid, aqueous sulfuric acid, and the like, and a sufficient amount of an organic solvent inert to the reaction to dissolve or substantially dissolve the Δ$^{5(10)}$ steroid of Formula II. Suitable organic solvents include chloroform, methylene chloride, benzene, hexane, chlorobenzene, and the like. The reaction temperature can vary from about room temperature or lower to the reflux temperature of the reaction mixture, preferably a temperature above room temperature is employed.

A triol of Formula III is then acylated by treatment with a lower hydrocarbon carboxylic acylating agent to obtain the 3β,5α,10β-triacylate IV. For example, acylation of a triol of Formula III can be accomplished by treatment with a lower hydrocarbon carboxylic anhydride, e.g. acetic anhydride, in the presence of a lower hydrocarbon carboxylic acid, e.g. acetic acid, and an acid catalyst such as perchloric acid, p-toluene-sulfonic acid, and the like. This reaction is preferably conducted at about room temperature.

A triacylate of Formula IV is then treated with alcoholic base, i.e. a solution of a base and a lower monohydric alcohol such as an alkali metal hydroxide, e.g. sodium hydroxide, potassium hydroxide, and the like. in methanol, ethanol, and the like to furnish a 3β-hydroxy-5α,10β-diacyloxy steriod P. The amount of base present in the reaction mixture should be about one mole per mole of the triacylate of Formula IV. The reaction can be carried out at room temperature.

A 3β-hydroxy-5α,10β-diacyloxy steriod of Formula V is subjected to oxidation to obtain a 3-keto-5α,10β-diacyloxy of Formula VI. A preferred procedure employs an alkali metal dichromate and aqueous sulfuric acid together with sufficient organic solvent inert to the reaction to dissolve the 3β-hydroxy steriod of Formula V. Suitable organic solvents include chloroform, methylene chloride, benzene, hexane, and the like. This reaction can be carried out at a temperature of from about 0° C. or lower to about room temperature or slightly higher, preferably at a temperature of from about 10° C. to about 20° C. The amount of alkali dichromate, e.g. sodium dichromate, present should be at least about one molar equivalent based on the 3β-hydroxy steriod of Formula VI. This method is particularly advantageous in that A-ring aromatization is minimized or completely avoided due to the presence of the 5α,10β-diacyloxy substituents.

A 3-keto-5α,10β-diacyloxy steriod of Formula VI is then transformed by treatment with base into a 3-keto-10β-acyloxy-Δ$^4$ steriod of Formula VII. This conversion or transformation can be accomplished using mild alkaline conditions such as by treatment with a molar equivalent of an alkali metal acetate, e.g. sodium acetate, in a lower monohydric alcohol such as methanol, and the like at about the reflux temperature of the reaction mixture for a short period of time of the order of about ½ hour to about 4 hours, generally about 2 hours.

A 3-keto-10β-acyloxy-Δ$^4$ steriod of Formula VII can then be converted into a 3-keto-Δ$^{5(10)}$ steriod of Formula VIII or into a 3-keto-Δ$^4$-19-nor steroid of Formula IX. Advantageously, a steriod of Formula VII is treated with zinc:copper couple in the presence of acetic acid in an organic solvent at about room temperature to furnish a 3-keto-$\Delta^{5(10)}$ sterioid of Formula VIII in essentially quantitative yield. The reaction can be carried out at room temperature and in which case the reaction takes from about one-half hour to about 3 hours to go to completion, generally abou one hour. Advantageously, the reaction is conducted under an inert atmosphere such as nitrogen. Suitable organic solvents include methanol, ethanol, methylene chloride, and the like which are inert to the reaction and in which the steroid VII is soluble. The amount of acetic acid, preferably anhydrous or glacial, present can vary within wide limits or constitute the entire solvent system, preferably there is used from about 1% to about 5% of anhydrous acetic acid, by weight based on the amount of organic solvent employed. Greater amounts of acetic acid can be employed but there is generally no advantage in using more than about 5% in that the presence of a greater amount only serves to complicate recovery of the desired 3-keto-$\Delta^{5(10)}$ steroid VIII from the reaction mixture. A further advantage of this method is that the transformation of VII into VIII proceeds at room temperature. The amount of zinc:copper couple present should be about equal to the amount of 3-keto-10$\beta$-acyloxy steriod of Formula VII employed, on a weight basis, preferably an excess of the zinc:copper couple is used. The zinc:copper couple can be prepared in situ or as a separate step by the reaction of zinc, e.g. zinc powder with a copper salt, e.g. cupric acetate, cupric sulface, and the like. The 3-keto-$\Delta^{5(10)}$ steriod of Formula VIII can be converted into a 3-keto-$\Delta^4$ steroid of Formula IX by either acid or alkaline isomerization.

Alternatively, a 3-keto-10$\beta$-acyloxy-$\Delta^4$ steriod of Formula VII can be converted into a 3-keto-$\Delta^4$-19-nor steroid IX by refluxing with zinc in acetic acid.

As a further alternative, a 3-keto-$\Delta^4$-19-nor steroid IX can be obtained by treatment of a 3-keto-5$\alpha$,10$\beta$-diacyloxy steroid of Formula VI. This conversion can be carried out by refluxing the 3-keto-5$\alpha$,10$\beta$-diacyloxy steroid with zinc in acetic acid. Another method is to reflux the 3-keto-5$\alpha$,10$\beta$-diacyloxy steroid with zinc:copper couple in an organic solvent, e.g. methanol, ethanol, methylene chloride, and the like in the presence of acetic acid. The amount of acetic acid present should be about at least 25% by weight, based on the amount of organic solvent employed.

In the practice of the above illustrated syntheses of 19-nor steroids involving the reaction route of II–X–XI–XIV–VII or IX, a 3$\beta$-hydroxy-$\Delta^{5(10)}$ steroid II is treated with a peracid, e.g. perbenzoic acid, peracetic acid, n-chloroperbenzoic acid, and the like, in an organic solvent inert to the reaction, e.g. chloroform, benzene, hexane, chlorobenzene, and the like, to form a mixture of the 5$\alpha$,10$\alpha$- and 5$\beta$,10$\beta$-epoxides X, the latter generally predominating. This mixture of epoxides or the individual isomers there which are separable by chromatography is then treated wtih aqueous acid, e.g. aqueous acetic acid, sulfuric acid, or the like to give the novel 3$\beta$,5$\alpha$,10$\beta$-triol III which is then subjected to oxidation to form the 3-keto-5$\alpha$,10$\beta$-dihydroxy steroid of Formula XI. Alternatively, the steroid XI can be obtained in one step by performing the oxidation under aqueous acidic conditions, e.g. oxidation using Jones reagent of the mixture of epoxides X to give in one step the 3-keto-5$\alpha$,10$\beta$-diol XI. Other oxidizing agents for the conversion of X into XI include alkali metal dichromate, e.g. sodium dichromate, in aqueous sulfuric acid, and the like.

A 3-keto-5$\alpha$,10$\beta$-diol XI is then treated under alkaline conditions to form a 3-keto-10$\beta$-hydroxy-$\Delta^4$ steroid of Formula XIV (XIV, R' is hydrogen). This conversion can be carried out using an alkali hydroxide, e.g. sodium hydroxide or potassium hydroxide, or the like in a lower monohydric alcohol, e.g. methanol, under reflux conditions. Thereafter, a 3-keto-10$\beta$-hydroxy steroid (XIV, R' is hydrogen) is converted into a 19-nor steroid of either Formula VIII or IX using the methods described hereinabove in connection with the conversion of VII into VIII and IX, respectively. In preparing a steroid of Formula VIII from steroid XIV (R' is hydrogen) using zinc:copper couple, it is preferable that in this case that the amount of acetic acid present in the reaction mixture be at least about 25% because of the more rigorous conditions required by the presence of the 10$\beta$-hydroxyl group.

In lieu of the above procedure for the preparation of a 3-keto-10$\beta$-hydroxy-$\Delta^4$ steroid (XIV, R' is hydrogen), a steroid of Formula X, i.e. a 3$\beta$-hydroxy-5,10-epoxide, can be subjected to Oppenauer oxidation conditions to form the 3-keto-10$\beta$-hydroxy-$\Delta^4$ steroid in one step. In this conversion, 3$\beta$-hydroxy-5,10-epoxide is treated with aluminum alkoxide, e.g. aluminum isopropoxide, aluminum ethoxide, and the like, in an anhydrous organic solvent inert to the reaction, e.g. toluene, benzene, hexane, and the like in the presence of a ketone, e.g. cyclohexanone, and the like, under reflux.

In another embodiment, a 3-keto-5$\alpha$,10$\beta$-dihydroxy steroid of Formula XI is converted into a 3-keto-$\Delta^4$-19-nor steroid of Formula IX by treatment with zinc or zinc:copper couple according to the procedure described above for the conversion of steroid VI into a 19-nor steroid IX.

In another embodiment of the present invention illustrated above which involves the reaction route of II–XII–XIII–XIV–VIII or IX, a steroid of Formula II is treated with an organic peracid, e.g. one of those set out above, in an anhydrous carboxylic acid reaction medium to form a mixture of 5$\alpha$,10$\beta$-disubstituted steroids represented by Formula XII, i.e. a mixture of a 3$\beta$,10$\beta$-dihydroxy-5$\alpha$-acyloxy steroid and 3$\beta$,5$\alpha$-dihydroxy-10$\beta$-acyloxy steroid, the 5$\alpha$-acyloxy steroid being the major product. This reaction is preferably conducted at about room temperature using a lower hydrocarbon carboxylic acid reaction medium which is anhydrous, e.g. acetic acid, propionic acid, and the like. If the carboxylic acid employed is not anhydrous but rather contains water, there will also be formed the 3$\beta$,5$\alpha$,10$\beta$-triol III in varying amounts depending upon the amount of water present. The mixture of products can be separated at this stage, e.g. by chromatography, if desired, or the thus-obtained mixture used as the starting material in the next step. Preferably, the mixture is next subjected to oxidation using a mixture of dicyclohexylcarbodiimide, dimethylsulfoxide and acid according to U.S. 3,248,380 or one of the oxidation procedures described above to obtain a 3-keto steroid of Formula XIII, i.e. a mixture of a 3-keto-5$\alpha$,10$\beta$-dihydroxy 5-acylate and 3-keto-5$\alpha$,10$\beta$-dihydroxy 10-acylate. This mixture or the individual isomers is then converted into a 3-keto-$\Delta^4$-10$\beta$-hydroxy and 10$\beta$-acyloxy steroid of Formula XIV by treatment with base, e.g. by treatment with an alkali hydroxide in alcohol as described above. The thus-obtained mixture of steroids represented by Formula XIV (R' is hydrogen and lower acyl) is then converted into a 19-nor steroid of Formula VIII or IX using the procedures described above for the conversion of XIV (R' is hydrogen) into VIII or IX. Alternatively, the mixture of steroids of Formula XIV (R'=hydrogen and lower acyl) can be separated and the individual isomers separately treated to form a 19-nor steroid of Formula VIII or IX utilizing the procedures described hereinabove for the individual steroids.

In still another embodiment of the present invention, which is especially useful for the preparation of steroids of the 19-nor androstane series which are substituted at C–17 with a free hydroxyl group, or a free hydroxyl group in combination with an alkyl group, alkenyl group or alkynyl group, a 3-keto 5$\alpha$,10$\beta$-disubstituted steroid of either Formula VI, XI or XIII having a keto group at C–17 is treated with a lower monohydric alcohol in the presence of an acid catalyst e.g. perchloric acid, sulfuric acid, malonic acid, oxalic acid, acetic acid, HCl gas, and the like, at room temperature to furnish the corresponding 3α,3β-dialkoxy steroid of Formula XV illustrated below:

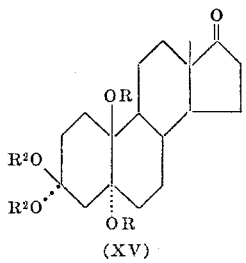

(XV)

wherein R² is a lower alkyl group and R is hydrogen or a lower carboxylic acyl group.

The novel compound of Formula XV is then modified at C–17 to obtain a compound of Formula XVI illustrated below:

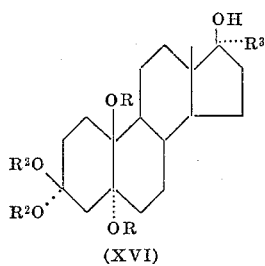

(XVI)

wherein R³ is hydrogen, lower alkyl, lower alkenyl or lower alkynyl and R² and R are as defined above. A compound of Formula XVI above where R³ is hydrogen can be obtained by treatment of compound of Formula XV with a reducing agent such as sodium borohydride, lithium aluminum hydride, and the like in a lower alcohol or other inert solvents such as dioxane, tetrahydrofuran and the like at about the reflux temperature of the reaction mixture. Alternatively, a compound of Formula XV can be treated with an appropriate Grignard reagent, e.g. dimethyl magnesium bromide, and the like to obtain the corresponding 17α-alkyl, alkenyl or alkynyl steroid of Formula XVI.

A steroid of Formula XVI is then treated with a weak acid solution for example aqueous hydrochloric acid, perchloric acid, acetic acid, and the like, in an inert organic solvent, e.g. methanol, ethanol, benzene, hexane, and the like at about room temperature to obtain a corresponding 3-keto steroid of Formula XVII illustrated below.

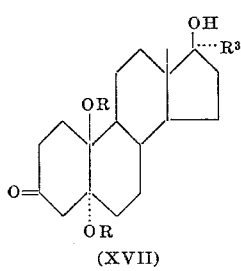

(XVII)

wherein R and R³ are as defined above. A steroid of Formula XVII is then converted into either the corresponding Δ⁵⁽¹⁰⁾steroid or 19-nor-Δ⁴ steroid using the procedures described hereinabove in connection with the conversion of a compound of Formula VI, XI or XIII into a compound of Formula VIII or IX.

In another embodiment of the present invention, valuable aromatic A ring steroids are prepared utilizing a 3β, 5α,10β-triol steroid III as the starting material. Thus, treatment of a 3β,5α,10β-triol III with a dehydration agent, e.g. phosphorus oxychloride, thionyl chloride, and like in the presence of pyridine in an organic solvent such as benzene, toluene and the like at about reflux furnishes valuable 3-desoxy-1,3,5(10)-triene steroids.

In another embodiment of this invention, a 3-keto-10β-hydroxy-Δ⁴ steroid (XIV, R' is hydrogen) or 3-keto-10β-acyloxy-Δ⁴ steroid (XIV, R' is acyl) is transformed into valuable 3-hydroxy-1,3,5(10),9(11)-tetraene steroids. In this transformation, a 3-keto-10β-substituted-Δ⁴ steroid is first dehydrogenated at C–1,2 by treatment with selenium dioxide, 2,3 - dichloro-5,6-dicyano-1,4-benzoquinone, and the like to form the corresponding 3-keto-10β-substituted-Δ¹,⁴ steroid which is then treated with a dehydration agent, e.g. phosphorus oxychloride, thionyl chloride and the like in the presence of pyridine in an inert organic solvent such as benzene, toluene, tetrahydrofuran dioxane, and the like at about reflux to form a 3-hydroxy-1,35(10), 9(11)-tetraene steroid.

In another embodiment of the present invention, there are prepared valuable 3-alkoxy-1,3,5(10)-triene steroids by treating a 3-keto-5α,10β-disubstituted steroid of Formula VI, XI or XIII with an orthoester such as an alkyl orthoformate in the presence of an acid catalyst and a lower monohydric alcohol solvent, the alcohol solvent being the same as the alkyl portion of the alkyl orthoformate, thereby forming the corresponding 3-alkoxy-1,3,5(10)-triene. In this reaction, free keto groups, such as at C–11, C–16, C–17 and/or C–20, will be ketalized but can be readily regenerated thereafter by treatment with acid according to methods well known to the art. Thus, for example, treatment of 5α,10β-dihydroxyestrane-3,17-dione with methyl orthoformate in methanol in the presence of an acid catalyst, e.g. p-toluenesulfonic acid, sulfuric acid, and the like at reflux yields 3,17α,17β-trimethoxyestra-1,3,5(10)-triene which upon acid hydrolysis yield 3-methoxyestra-1,3,5(10)-trien-17-one, a valuable compound of known utility. Likewise, 3-methoxy-17α-ethynylestra-1,3,5(10)-trien-17β-ol is obtained from 17α-ethynyl-5α,10β,17β-trihydroxyestran-3-one or the 5,10-diacylate thereof, e.g. 17α-ethynyl-5α,10β-diacetoxy-17β-hydroxyestran-3-one via this procedure.

In another embodiment of the present invention, valuable aromatic A ring compounds are obtained by treating a 3-keto-5α,10β-diacyloxy steroid of Formula VI with an aqueous solution of a strong acid, e.g. sulfuric acid, phosphoric acid, hydrochloric acid, trichloroacetic acid, trichloroacetic acid, p-toluenesulfonic acid, and the like in a water-miscible organic solvent, e.g. dioxane tetrahydrofuran, and the like, inert to the reaction. Surprisingly, this conversion proceeds at relatively low temperatures, i.e. about room temperature to about 60 or 80° C., preferably 35° C. to about 60° C., and is complete in only a few about 10 to 30 minutes, preferably 15 minutes to about 30 minutes, to yield 3-hydroxy-1,3,5(10)-triene steroids. In the case of 3-keto-5α,10β-dihydroxy steroids of Formula XI, conversion to 3-hydroxy-1,3,5(10)-triene steroids requires more rigorous conditions, i.e. reflux for several hours.

A 3-keto-5α,10β-diacyloxy steroid of Formula VI is an excellent material for the preparation of the corresponding 3-alkoxy-1,3,5(10)-triene, a valuable class of steroids. This conversion is accomplished by treating a 3-keto-5α,10β-diacyloxy steroid with a strong acid, e.g. conc. H₂SO₄, phosphoric acid, trichloroaceticacid, hydrochloric acid, p-toluenesulfonic acid, and the like in a lower alcohol reaction medium, preferably anhydrous alcohol, e.g. methanol, ethanol, propanol, and the like at mild temperatures, e.g. room temperature to about 50 to 60° C., for a few minutes, e.g. about 10 to 30 minutes. Due to the presence of the 5α,10β-diacyloxy groups, e.g. 5α,10β-diacetoxy, unlike 3-oxo-5α,10β-dihydroxy steroids, it is not necessary to use high temperatures or reflux conditions for several hours for the reaction to go to completion.

In the syntheses outlined and illustrated above, the starting material of general Formula I is a 3β-hydroxy-6-hydroxy-Δ$^{5(10)}$ steroid or a 3β-hydroxy-6-acyloxy-Δ$^{5(10)}$ steroid. Examples of starting materials of the general Formula I, preferably of the 19-nor-androstane, 19-nor-pregnane (including 19-nor-corticoids), and 19-nor-sapogenin series are:

3β-hydroxy-6-acetoxyestr-5(10)-en-17-one,
3β,6-dihydroxyestr-5(10)-en-17-one,
6-acetoxyestr-5(10)-ene-3β,17β-diol,
estr-5(10)-ene-3β,6,17β-triol,
17α-methyl-6-acetoxyestr-5(10)-ene-3β,17β-diol,
17α-methylestr-5(10)-ene-3β,6,17β-triol,
17α-ethyl-6-acetoxyester-5(10)-ene-3β,17β-diol,
17α-ethynyl-6-acetoxyestr-5(10)-ene-3β,17β-diol,
3β-hydroxy-6-benzoyloxyestr-5(10)-en-17-one,
3β-hydroxy-6-acetoxy-19-nor-pregn-5(10)-en-20-one,
3β,6-dihydroxy-19-nor-pregn-5(10)-en-20-one,
3β,6,17α-trihydroxy-19-nor-pregn-5(10)-en-20-one,
3β-hydroxy-6,17α-diacetoxy-19-nor-pregn-5(10)-en-20-one,
3β,17α-dihydroxy-6-acetoxy-19-nor-pregn-5(10)-en-20-one,
3β,6-dihydroxy-17α-acetoxy-19-nor-pregn-5(10)-en-20-one,
3β-hydroxy-6-acetoxy-16α-methyl-19-nor-pregn-5(10)-en-20-one,
3β-hydroxy-6-acetoxy-16β-methyl-19-nor-pregn-5(10)-en-20-one,
3β-hydroxy-6,17α-diacetoxy-16α-methyl-19-nor-pregn-5(10)-en-20-one, and the 16β-methyl isomer, 3β,17α-dihydroxy-16α-methyl-6-acetoxy-19-nor-pregn-5(10)-en-20-one and the 16β-methyl isomer, 3β-hydroxy-6-benzoyloxy-19-nor-pregn-5(10)-en-20-one,
3β,6-dihydroxy-16α-methyl-19-nor-pregn-5(10)-en-20-one and the 16β-methyl isomer, 3β-hydroxy-6,17α-diacetoxy-16α-methyl-19-nor-pregn-5(10)-en-20-one and the 16β-methyl isomer, 3β,17α-dihydroxy-6-acetoxy-16α-methyl-19-nor-pregn-5(10)-en-20-one and the 16β-methyl isomer, 3β,6,17α-trihydroxy-16α-methyl-19-nor-pregn-5(10)-en-20-one and the 16β-methyl isomer,
3β,17α,21-trihydroxy-6-acetoxy-19-nor-pregn-5(10)-en-20-one
3β,6,17α,21-tetrahydroxy-19-nor-pregn-5(10)-en-20-one,
3β,16α,17α,21-tetrahydroxy-6-acetoxy-19-nor-pregn-5(10)-en-20-one and the 16, 17-acetal or ketal thereof, e.g.

3β,21-dihydroxy-6-acetoxy-16α,17α-isopropylidenedioxy-19-nor-pregn-5(10)-en-20-one,
3β-hydroxy-6,17α,21-triacetoxy-19-nor-pregn-5(10)-en-20-one,
16α,17α-isopropylidenedioxy-3β-hydroxy-6-acetoxy-19-nor-pregn-5(10)-en-20-one,
3β,16α,17α-trihydroxy-6-acetoxy-19-nor-pregn-5(10)-en-20-one,
3β,6,16α,17α-tetrahydroxy-19-nor-pregn-5(10)-en-20-one, and the like.

The configuration at C–6 has not been specified. In the practice of the syntheses described herein, the configuration at C–6 can be either alpha or beta or a mixture of the 6–alpha and 6–beta isomers can be employed.

In the syntheses outlined and illustrated above, the starting material of the general Formula I is shown as having a 3β-hydroxy group at C–3. While a steroid having a 3β-hydroxy group as shown in Formula I is preferred, it is not essential in the practice of the novel syntheses of the present invention. Thus, for example, in addition to the foregoing steroids listed above as exemplary of starting materials of the general Formula I, there can be employed the corresponding ether, carboxylic acid ester, oxo or protected oxo group. In the case of steroids of the estrane or 19-nor-androstane series, the steroid can be substituted at C-17 by the same groups that are present at C-3 or the C-3 and C-17 substituents can be different. Typical groups which can be present at C-17 include, hydroxy, oxo, alkylenedioxy, e.g. methylenedioxy, acyloxy, tetrahydrofuran - 2-yloxy, tetrahydropyran-2-yloxy, and the like. In the case of steroids of the 19-nor-pregnane series there can be present, for example, at C–11 a hydroxyl group (α or β) or a free or protected oxo group, at C–16, a free or protected hydroxyl group (preferably alpha) or a methyl group (α or β); at C–17, a free or protected hydroxyl group, at C–20, a free or protected hydroxyl group or a free or protected oxo group and at C–21, a free or protected hydroxyl group, and the like. Upon completion of the conversion of a steroid of Formula I into a steroid of Formula II, i.e. elimination of the 6-hydroxy or 6-acyloxy group, the protective group(s) if present, can be removed by procedures well known in the art to regenerate the hydroxyl group or oxo group. Alternatively, the protective groups can be retained and removed at a later time in the syntheses, if desired. Some protecting groups will be removed as a natural consequence of practicing the various steps in the above syntheses. Whether or not a particular procedure of the novel syntheses described herein will also remove a protecting group will be apparent to those skilled in the art upon consideration of the conditions described herein, from the examples and from routine experimentation. For example, under the novel procedure described herein for the production of a 3β,5α,10β-triol of Formula III from a Δ$^{5(10)}$ steroid of Formula II, alkylenedioxy, tetrahydrofuran-2-yloxy or tetrahydropyran-2-yloxy group(s) present will come off to give the corresponding oxo or hydroxyl group(s) as would be expected by those skilled in the art because of the acid conditions of this procedure. Exemplary of compounds other than those listed above are 17α,20;20,21-bismethylenedioxy-6-acetoxy-19-nor-pregn-5(10)-en-3β-ol,
17α,20;20,21-bismethylenedioxy-19-nor-pregn-5(10)-en-3β,6-diol,
17α,20;20,21-bismethylenedioxyy-3β-hydroxy-6-acetoxy-19-nor-pregn-5(10)-en-11-one,
17α,20;20,21-bismethylenedioxy-3β-6-dihydroxy-19-nor-pregn-5(10)-en-11-one,
17-ethylenedioxy-6-acetoxyestr-5(10)-en-3β-ol,
3,17-bis(ethylenedioxy)estr-5(10)-en--ol 6-acetate,
6-acetoxyestr-5(10)-ene-3,17-dione,3β,
6-diacetoxyestr-5(10)-en-17-one,
estr-5(10)-ene-3β,5,17β-triol 3,5,17-triacetate,
3β,17β-bis(tetrahydropyran-2'-yloxy)estr-5(10)-en-6-ol 6-acetate,
6-acetoxy-19-nor-pregn5(10)-ene-3β,20-diol,
3β,6-diacetoxy-19-nor-pregn-5(10)-en-20-one,
3β-(tetrahydrofuran-2'-yloxy)-6-acetoxy-19-nor-pregn-5(10)-en-20-one,
3,20-bis(ethylenedioxy)-19-nor-pregn-5(10)-en-6-ol 6-acetate, and the like.

The foregoing specifically enumerated steroids substituted at C–6 are representative of starting materials for the novel syntheses of the present invention. One admirably suitable method for the preparation of these starting materials is to react a 3β,19-dihydroxy-Δ$^5$ steroid, preferably of the androstane, pregnane or sapogenin series, with a lead tetraacylate, e.g. lead tetraacetate, lead tetrabenzoate, and the like to yield a 3β,6-dihydroxy-Δ$^{5(10)}$6-acylate, preferably the acetate, see for example U.S. Pats. 3,270,007 and 3,318,923. Another suitable method for the preparation of the starting material is described in U.S. Pat. 3,178,419. These steroidal starting materials can also be obtained, for example, by reduction of $\Delta^{5(10)}$-6-oxo steroids.

In the first step or procedure of the novel syntheses of the present invention wherein a $\Delta^{5(10)}$-6-acyloxy or $\Delta^{5(10)}$-6-hydroxy steroid is treated with Raney nickel to give a $\Delta^{5(10)}$-6-unsubstituted steroid, if the starting material is substituted with an unsaturated group, e.g. 17α-alkenyl or 17α-alkynyl, or there is unsaturation at some other place in the steroid molecule, the unsaturation may become partially or completely saturated depending upon the particular conditions employed, e.g. amount of Raney nickel used and length of time the reaction is permitted to run, as would be expected by those skilled in the art. For example, in the case of an unsaturated starting material such as 17-α-vinyl-6-acetoxyestr-5(10) - ene - 3β,17β-diol, or 17α - ethnyl - 6 - acetoxyestr - 5(10)-ene-3β,17β-diol, part or all of the starting material may be converted into the corresponding C–6 unsubstituted 17α-ethyl or 17α-vinyl, respectively. The most favorable conditions for this reaction can be easily determined by one of ordinary skill in the art consistent with the end sought, i.e. reduction or non-reduction of the unsaturation, by routine experimentation. Alternatively, unsaturation of the steroid molecule or introduction of an unsaturated group can be performed after this initial step by conventional methods known in the art.

The expression "lower alkyl" as used herein refers to a straight or branched alkyl group of 1 to 6 carbon atoms such as methyl, ethyl, isopropyl, butyl, and the like. The expression "carboxylic acyl group of less than 12 carbon atoms" as used herein refers to carboxylic acyl groups conventionally employed in the steroid art containing less than 12 carbon atoms such as acetyl, trimethylacetyl, phenoxyacetyl, propionyl, cyclopentylpropionyl, butyryl, enanthyl, benzoyl, succinyl, trichloroacetyl, and the like, preferably acetyl.

The following examples are provided to illustrate the present invention.

EXAMPLE 1

Part A

Five hundred grams of androst-5-ene-3β,19-diol-17-one suspended in 8 liters of benzene is azeotroped until about 250 ml. of solvent is removed. The mixture is cooled to 50° C. and then 750 g. of lead tetraacetate is added. The mixture is slowly distilled for about 40 minutes until about 2000 ml. of distillate, including azeotrope, is collected. The resulting mixture is cooled, washed two times, once with 2 liters of saturated sodium bicarbonate solution and then once with 2 liters of water. The aqueous washings are backwashed with benzene. The thus-obtained benzene solution and benzene backwashings are then combined, dried over sodium sulfate and concentrated under reduced pressure to a honey-like syrup of a mixture of the 6 alpha and 6 beta isomer of estr-5(10)-ene-3β,6-diol-17-one 6-acetate, predominantly the 6β-isomer.

By repeating the above procedure using other $\Delta^5$-3β, 19 - diol steroids as the starting material in place of androst-5-ene-3β,19-diol-17-one, for example, androst-5-ene - 3β,17β,19 - triol, 17α-methylandrost-5-ene-3β,17β, 19 - triol, 17α-ethylandrost-5-ene-3β,17β,19 - triol, 17α-vinylandrost-5-ene-3β,17β,19-triol, 17α - ethynylandrost-5-ene-3β,17β,19-triol, 3β,17α,19,21 - tetrahydroxypregn-5-en-20-one 17,21-diacetate, 17α,20;20,21-bis-methylenedioxypregn-5-ene-3β,19-diol, 3β,19 - dihydroxypregn - 5-en-20-one, 3β,17α,19-trihydroxypregn-5-en-20 - one 17-acetate, 3β,17α,19 - trihydroxypregn-5-en-20-one, 19-hydroxy-diosgenin, and the like, the corresponding $\Delta^{5(10)}$-3β,6-diol 6-acetate steroids are obtained, i.e. a mixture of the 6α and 6β isomer of 6-acetoxyestr-5(10)-ene-3β, 17β - diol,17α-methylestr-5(10)-ene-3β,6,17β - triol 6-acetate, 17α-ethylestra-5(10)-one-3β,6,17β-triol 6-acetate, 17α-vinylestr-5(10)-ene-3β,6,17β-triol 6-acetate, and the like.

Part B

To the mixture of the 6 alpha and 6 beta isomers of estr-5(10) - ene-3β,6-diol-17-one 6 - acetate obtained in Part A, there is added one liter of ethanol followed by 1.5 liters of fluffed Raney nickel (aqueous mixture containing about 1.32 kg. of wet Raney nickel as supplied) and then 4 liters more of ethanol. The mixture is refluxed for one hour, cooled and filtered over diatomaceous earth followed by washing the cake with 500 ml. of ethanol. The thus-obtained filtrate and washing are combined and a concentrated solution of KOH in water (30% w./v.) is added thereto until the mixture turns pH paper blue. The mixture is then stirred under nitrogen for 15 minutes and then conc. hydrochloric acid is added until the mixture turns pH paper yellow. 500 ml. of water is then added to the mixture followed by elimination of ethanol under reduced pressure. The thus-obtained concentrate is then extracted with methylene chloride (3 times) and the combined methylene chloride extracts are then washed with water and concentrated at atmospheric pressure to a volume of about 1 liter. This concentrate is added to 4 liters of 10% aqueous acetic acid solution, rinsing with methylene chloride as needed. This mixture is stirred to start to blend the two layers and 230 ml. of 48.5% (w./v.) aqueous peracetic acid solution diluted with 230 ml. of water is added at once. The mixture, under continuous stirring, is heated slowly (to about 60° C.) while vacuum is being applied to eliminate the methylene chloride. The mixture is kept at 60° C. for one hour. The mixture is then cooled at room temperature and the stoiochiometrical quantity of aqueous NaOH is added to neutralize all the acetic acid (including that formed from the peracetic acid). The mixture in then saturated with NaCl and cooled in an ice bath to 5°–10° C. for one hour. The crystalline solid is collected by filtration, washed with water and dried at 40°–60° C. under vacuum to yield 3β,5α,10β - trihydroxyestran-17-one. The aqueous mother liquors can be extracted with ethyl acetate and the ethyl acetate extracts concentrated to dryness under reduced pressure, the crystalline residue thus obtained being treated with methylene chloride and filtered to furnish an additional crop of the 3β,5α,10β-triol.

Part C

To a mixture of 50 g. of 3β,5α,10β-trihydroxy-estran-17-one, 100 ml. of acetic anhydride and 25 ml. of acetic acid at about 15–20° C., there is added 1 ml. of 20% perchloric acid and 25 ml. of acetic acid. This mixture is stirred at room temperature for 5 hours, cooled in an ice bath (15–20° C.) and 12.5 ml. of water is slowly added. The resulting mixture is then poured into 2.5 liters of water, filtered, and the thus-collected solid washed with water. The thus-collected solid is dissolved in 150 ml. of methylene chloride which is then washed with concentrated aqueous sodium bicarbonate solution, and the methylene chloride phase which contains 3β,5α,10β-trihydroxyestran-17-one 3,5,10-triacetate is adjusted to a total volume of about 250 ml. by addition of methylene chloride. To this mixture is added a solution of 2.5 g. of potassium hydroxide in 100 ml. of methanol. This mixture is stirred for 2½ hours at room temperature and is then poured into 250 ml. of water. This mixture is extracted (3 times) with methylene chloride. The methylene chloride extracts are combined and evaporated to dryness to furnish 3β-hydroxy-5α,10β-diacetoxyestran-17-one. The thus-obtained 3β-hydroxy-5α,10β-diacetoxy compound is added to 150 ml. of methylene chloride and the resulting mixture cooled to 15° C. To this mixture there is added a mixture of 16.5 g. of sodium dichromate, 12.4 ml. of sulfuric acid and about 85 ml. of water. This mixture is then stirred at 15–20° C. for about 1.5 hours. The mixture is then allowed to stand for about 45 minutes to permit the layers to separate. The organic layer is then separated, washed with 100 ml. of water, dried, and evaporated to furnish 5α,10β- diacetoxy estrane-3,17-dione. A mixture of the thus-obtained 3,17-dione, 500 ml. of methanol and 10 g. of sodium acetate is refluxed for about two hours. This mixture is then slowly added to 500 ml. of water while distilling off methanol under vacuum. The resulting mixture is then filtered and the thus-collected filtrate washed with water and air dried to furnish 10β-acetoxy estr-4-ene-3,17-dione. A mixture of the thus-obtained Δ⁴-3,17-dione, 475 ml. of methanol, 50 g. of zinc powder, 16.5 g. of cupric acetate and 25 ml. of glacial acetic acid is stirred at room temperature for about 1 hour under nitrogen atmosphere and then filtered. To the thus-obtained filtrate is slowly added 500 ml of water, then 1.5 l. of saturated aqueous sodium chloride solution. The mixture is filtered and the solid collected is washed with water and dried to furnish estr-5(10)-3,17-dione.

EXAMPLE 2

Five grams of a mixture of the 6α and 6β isomers of 3β,6-dihydroxyestr-5(10)-en-17-one 6-acetate (predominantly the 6β isomer) is added to 75 ml. of ethanol, 15 ml. of fluffed Raney nickel (about 13.3 g. of wet Raney nickel as supplied) is then added and the resulting mixture is refluxed for 45 minutes. The mixture is then cooled, filtered over diatomaceous earth to remove the nickel catalyst, and the filter cake washed with ethanol. The filtrate and washings are combined, concentrated under vacuum to a volume of about 35 ml. and conc. aqueous NaOH is added until the mixture gives an alkaline reaction to pH paper. This mixture is allowed to stand at room temperature for 15 minutes and then conc. hydrochloric acid is added until the mixture turns pH paper yellow. The mixture is diluted with water, extracted with methylene chloride and the methylene chloride extracts washed with water, dried and concentrated to dryness under reduced pressure to yield 3β-hydroxyestr-5(10)-en-17-one.

A mixture of 2.5 g. of 3β-hydroxyestr-5(10)-en-17-one, 100 ml. of chloroform and 1.1 molar equivalents of m-chloroperbenzoic acid is allowed to stand at room temperature for 20 hours and then diluted with 100 ml. of water. The organic layer is separated, washed with aqueous sodium bicarbonate solution and then with water to neutrality, dried over sodium sulfate and evaporated to dryness to yield a mixture of 3β-hydroxy-5β,10β-oxidoestran-17-one and 3β-hydroxy-5α,10α-oxidoestran-17-one, the 5β,10β-epoxide predominating.

To a stirred solution of 1 g. of the above mixture of 5α,10α- and 5β,10β-epoxides in 10 ml. of acetone, cooled to 0° C. is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 5α,10β-dihydroxyestrane-3,17-dione which may be further purified by recrystallization from acetone:hexane.

One gram of 5α,10β-dihydroxyestrane-3,17-dione in 50 ml. of 1% methanolic sodium hydroxide solution is refluxed for 30 min., poured into ice water and extracted with methylene chloride. The methylene chloride extracts are washed with water, dried over sodium sulfate and evaporated to dryness to yield 10β-hydroxyestr-4-ene-3,17-dione.

One gram of 10β-hydroxyestr-4-ene-3,17-dione is added to a mixture of 20 ml. of 25% methanolic acetic acid, 2 g. of zinc powder , 1 g. of cupric acetate and then stirred at room temperature under nitrogen atmosphere for one hour. The reaction mixture is then filtered and the solid thus collected is washed well with methylene chloride. The combined filtrate and methylene chloride washings is added to 100 ml. of water and additional methylene chloride is added. This mixture is separated and the organic phase is washed with water, dried over sodium sulfate and evaporated to dryness to furnish estr-5(10)-ene-3,17-dione.

A mixture of one gram of estr-5(10)-ene-3,17-dione, 25 ml. of methanol and 0.3 ml. of conc. hydrochloric acid is refluxed for one hour. The mixture is then diluted with ice water, filtered and the thus-collected solid is washed with water and dried to yield estr-4-ene-3,17-dione.

EXAMPLE 3

A solution of 1 g. of a mixture of the 5α,10α-epoxide and 5β,10β-epoxide of 3β-hydroxyestr-5(10)-en-17-one in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 10β-hydroxyestr-4-ene-3,17-dione which may be further purified by recrystallization from acetone:hexane.

EXAMPLE 4

One gram of 5α,10β-dihydroxyestrane-3,17-dione is dissolved in 10 ml. of glacial acetic acid and added over a period of 1 to 2 minutes to a mixture of 7 g. of zinc dust in 40 ml. of glacial acetic acid which has been refluxing with efficient stirring for 30 minutes. The mixture is held under reflux for 90 minutes and then filtered over Celite diatomaceous earth. The filtrate is concentrated to small volume and diluted with water. The precipitate thus obtained is collected by filtration. The precipitate is dissolved in about 20 ml. of methylene chloride, dried over anhydrous sodium sulfate and treated with 1 g. of alumina and 200 mg. of charcoal. The mixture is then filtered over a layer of Celite diatomaceous earth and the filtrate is concentrated to dryness under reduced pressure. The crystalline residue thus obtained is dissolved in about 5 ml. of methanol and a solution of 300 mg. of sodium hydroxide in 1 ml. of water is added. The mixture is allowed to stand at room temperature for 10 minutes and then diluted slowly with 40 ml. of water. The methanol is evaporated under reduced pressure and the crystalline precipitate allowed to stand in the water overnight, then collected by filtration and dried on the steam bath to yield 700 mg. of estr-4-ene-3,17-dione.

EXAMPLE 5

To a mixture of 5 g. of 3β-hydroxyestr-5(10)-en-17-one and 50 ml. of glacial acetic acid at about 20° C., there is added 1.1 molar equivalents of peracetic acid. The mixture is allowed to stand at room temperature for about one hour and then is diluted with about 50 ml. of water. The mixture is then extracted with ethyl acetate (3 times) and the ethyl acetate extracts are combined, washed well with 5% aqueous sodium bicarbonate solution and with water, dried and concentrated to dryness to yield a mixture of 3β,10β-dihydroxy-5α-acetoxyestran-17-one and 3β,5α-dihydroxy-10β-acetoxyestran-17-one in which the 3β,10β-dihydroxy-5α-acetoxy steroid predominates.

A mixture of 3 g. of the above mixtures of 3β,10β-dihydroxy-5α-acetoxyestran-17-one and 3β,5α-dihydroxy-10β-acetoxyestran-17-one in 60 ml. of pyridine is added to a mixture of 3 g. of chromic trioxide in 10 ml. of pyridine. This mixture is allowed to stand at room temperature for 15 hours, diluted with 70 ml. of ethyl acetate and then filtered through diatomaceous earth. The filtrate is washed well with water, dried and evaporated to dryness to yield a mixture of 5α-acetoxy-10β-hydroxyestrane-3,17-dione and 10β-acetoxy-5α-hydroxyestrane-3,17-dione.

The thus-obtained mixture of 3,17-dione steroids is treated with sodium hydroxide in methanol by the procedure described in Example 2 (fourth paragraph) to furnish a mixture of 10β-hydroxyestr-4-ene-3,17-dione and 10β-acetoxyestr-4-ene-3,17-dione which upon treatment according to the procedure of Example 2 (fifth paragraph) furnishes estr-5(10)-ene-3,17-dione.

EXAMPLE 6

To 100 ml. of methanol containing 1 g. of 5α,10β-diacetoxyestrane-3,17-dione, there is added 0.03 ml. of 70% perchloric acid. This mixture is allowed to stand at room temperatuer for about 2 hours, then 3 ml. of pyridine is added and the mixture is then evaporated to dryness under reduced pressure. The residue is taken up in water and extracted with methylene chloride. The methylene chloride extracts are combined, washed with water, dried and evaporated to give 3α,3β-dimethoxy-5α,10β-diacetoxyestran-17-one which can be further purified by recrystallization.

Similarly, by using other 3,17-diketo steroids as the starting material, e.g. 5α,10β-dihydroxyestrane-3,17-dione, a mixture of 5α,10β-dihydroxyestrane-3,17-dione 5-acetate and 10-acetate, and the like, the corresponding 3,3-dimethoxy steroids are obtained.

Likewise, by using other lower monohydric alcohols, e.g. ethanol, n-propanol, and the like in place of methanol, the corresponding dialkoxy derivatives are obtained, e.g. 3α,3β-diethoxy-5α,10β-diacetoxyestran-17-one, and the like.

EXAMPLE 7

A solution of 1 g. of sodium borohydride in 3 ml. of water is added to an ice-cooled solution of 1 g. of 3α,3β-dimethoxy-5α,10β-diacetoxyestran-17-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3α,3β-dimethyloxy-5α,10β-diacetoxyestran-17β-ol which may be further purified by recrystallization from acetone:hexane.

EXAMPLE 8

A solution of 5 g. of 3α,3β-dimethoxy-5α,10β-diacetoxyestran-17-one in 250 ml. of thiophene-free benzene is treated with an equimolar amount of methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3α,3β-dimethoxy-17α-methyl-5α,10β-diacetoxyestran-17β-ol which is recrystallized from methylene chloride: hexane.

Similarly, by using vinylmagnesium bromide in the above procedure in place of methylmagnesium bromide, there is obtained 3α,3β-dimethoxy-17α-vinyl-5α,10β-diacetoxyestran-17β-ol.

EXAMPLE 9

A solution of 1 g. of 3α,3β-dimethoxy-5α,10β-diacetoxyestran-17-one in 30 ml. of anhydrous benzene is added under nitrogen to a solution of 1.4 g. of potassium in 30 ml. of tamyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3α,3β-dimethoxy-17α-ethynyl - 5α,10β-diacetoxyestran ‑ 17β-ol which is recrystallized from acetone:hexane.

EXAMPLE 10

A solution of 2.0 g. of 3α,3b-dimethoxy-17α-methyl-5α,10β-diacetoxyestran-17β-ol in 70 ml. of methanol and 7 ml. of 8% aqueous sulfuric acid is heated at reflux for 40 minutes, neutralized with a saturated aqueous sodium carbonate solution, concentrated under reduced pressure to about 20 ml. and poured into water. The solid which forms is collected by filtration, washed well with water and dried to yield 17β-hydroxy-17α-methyl-5α,10β-diacetoxyestran-3-one which may be recrystallized from acetone.

By use of the above procedure the other 3α,3β-dimethoxy steroids of Examples 8 and 9 are converted into the corresponding 3-keto steroids.

EXAMPLE 11

By subjecting the 3-keto steroids of Example 10 to the procedure set out in Example 1 (Part C) or paragraphs 4 and 5 of Example 2, the corresponding 3-keto-Δ$^{5(10)}$ steroids are obtained, i.e. 17β-hydroxy-17α-methylestr-5(10)-en-3-one, 17β-hydroxy - 17α - vinylestra-5(10)-en-3-one and 17β-hydroxy - 17α - ethynylestr-5(10)-en-3-one.

EXAMPLE 12

Twenty-five grams of 10β-hydroxyestr-4-ene-3,17-dione are added to a mixture of 500 ml. of glacial acetic acid, 50 g. of zinc powder and 25 g. of cupric acetate. This mixture is stirred at room temperature for one hour, during which time a slight exothermic reaction occurs. At the end of this time, the reaction mixture is filtered and the solid thus removed is washed well with methylene chloride. The combined filtrate and methylene chloride washings are added to 1 liter of water and extracted with additional methylene chloride. These methylene chloride extracts are washed well with water, dried over sodium sulfate and evaporated to yield predominately estr-5(10)-ene-3,17-dione.

Alternatively, the filtered zinc:copper reaction mixture and washings are concentrated under reduced pressure to eliminate most of the methylene chloride. Five milliliters of concentrated hydrochloric acid are then added and concentration is continued until the volume of the mixture is approximately ⅓ that of the original. Water is added and concentration is continued until the volume is approximately ¼ that of the original, after which time additional water is added and the mixture is filtered. The solid thus obtained upon filtration, consisting substantially of estr-4-ene-3,17-dione, may be further purified through recrystallization through methylene chloride.

EXAMPLE 13

A mixture of 0.5 g. of 10β-hydroxyestr-4-ene-3,17-dione 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 10β-hydroxyestra-1,4-diene-3,17-dione which is further purified by recrystallization from acetone:hexane.

Similarly, by use of the above process, other 10β-substituted Δ$^4$ steroids are converted into the corresponding Δ$^{1,4}$-diene steroids, e.g. use of 10β,17β-dihydroxy-17α-methylestr-4-en-3-one 10β,17β-dihydroxy - 17α - vinylestr-4-en-3-one, 10β,17β-dihydroxy - 17α - ethynylestr-4-en-3-one, 10β - acetoxyestr - 4 - ene - 3,17 - dione, 10β-acetoxy - 17β - hydroxy - 17α - methylestr - 4 - en - 3 - one, and the like to give the corresponding 1,2-dehydro derivatives, e.g. 10β,17β-dihydroxy - 17α - methylestra-1,4-dien-3-one, 10β,17β-dihydroxy 17α-vinylestra-1,4-dien-3-one, and the like.

A mixture of one gram of 10β-hydroxyestra-1,4-diene-3,17-dione, 2 ml. of pyridine, 10 ml. of benzene, and 3 ml. of phosphorus oxychloride is refluxed for about 1 hour. The reaction mixture is allowed to cool to about room temperature and then poured into ice water and extracted with ethyl acetate. The ethyl acetate extracts are combined, wahed, dried and evaporated to give 3-hydroxyestra-1,3,5(10),9(11) - tetraen - 17 - one.

By repeating the above procedure using as the starting material the other 1,4-dienes described above, the corresponding 3-hydroxy-1,3,5(10),9(11)-tetraenes are obtained, e.g. 17α - methylestra - 1,3,5(10),9(11)-tetraene-3,17β - diol, 17α - vinylestra - 1,3,5(10),9(11)-tetraene-3,17β - diol and 17α - ethynylestra - 1,3,5(10),9(11)-tetraene-3,17β-diol.

EXAMPLE 14

A mixture of 1 g. of 3β,5α,10β-trihydroxyestran-17-one, 2 ml. of pyridine, 10 ml. of benzene and 3 ml. of phosphorous oxychloride is refluxed for about 1 hour. The reaction mixture is allowed to cool to about room temperature, poured into water and the resulting mixture extracted with ethyl acetate. The ethyl acetate extracts are combined, washed, dried and evaporated to dryness to give estra-1,3,5(10)-trien-17-one which can be further purified by recrystallization.

Similarly, other 3β,5α,10β-triol steroids described herein can be converted into the corresponding 3-desoxy-1,3,5(10)-triene; e.g. 17α-methylestra - 1,3,5(10) - trien-17β-ol, 17α - ethynylestra - 1,3,5(10) - trien - 17β - ol, 19 - norpregna - 1,3,5(10) - trien-20-one, 17α-vinylestra-1,3,5(10)-trien-17β-ol, and the like.

EXAMPLE 15

The process of Example 1 (Part A) is repeated with the exception that androst-5-ene-3β,19 - diol-17-one is substituted by an equivalent amount of the following starting materials, 16α-methyl - 3β,19-dihydroxypregn-5-en-20 - one, 16β-methyl-3β,19 - dihydroxypregn-5-en-20-one, 16α - methyl - 3β,17α,19 - trihydroxypregn - 5 - en - 20-one and the 17-acetate thereof, 16α,17α - isopropylidenedioxy - 3β,19 - dihydroxypregn - 5 - en - 20 - one, 17α,20; 20,21 - bismethylenedioxy - 3β,19 - dihydroxypregn-5-en-11-one to afford a mixture of the corresponding Δ⁵⁽¹⁰⁾-3β, 6(α and β)-diol 6-acetate steroids, i.e. a mixture of the 6α and 6β-isomer of 16α-methyl-3β-hydroxy-6-acetoxy-19-norpregn-5(10)-en-20-one, a mixture of the 6α and 6β-isomer of 16β - methyl-3β-hydroxy-6-acetoxy-19-nor-pregn-5(10)-en-20-one, a mixture of the 6α and 6β isomer of 16α - methyl - 3β,17α - dihydroxy - 6 - acetoxy-19-nor-pregn-5(10)-en-20-one, and the like.

EXAMPLE 16

The process of Example 1 (Part B) is repeated with the exception of using an equivalent amount of other C–6 substituted steroids in place of 3β-hydroxy-6-acetoxy-estr-5(10)-en-17-one as the starting material, for example, 6-acetoxyestr-5(10)-ene-3β,17β-diol,
6-acetoxy-17α-methylestr-5(10)ene-3β,17β-diol,
3β-hydroxy-6,17α,21-triacetoxy-19-nor-pregn-5(10)-en-20-one,
17α,20;20,21-bismethylenedioxy-6-acetoxy-19-nor-pregn-5(10)-en-3β-ol,
3β-hydroxy-6-acetoxy-19-nor-pregn-5(10)-en-20-one,
3β-hydroxy-6,17α-diacetoxy-19-nor-pregn-5(10)-en-20-one,
3β,17α-dihydroxy-6-acetoxy-19-nor-pregn-5(10)-en-20-one,
3β-hydroxy-6-acetoxy-16α-methyl-19-nor-pregn-5(10)-en-20-one,
3β-hydroxy-6-acetoxy-16α,17α-isopropylidenedioxy-19-nor-pregn-5(10)-en-20-one, and the like to form the corresponding 3β,5α,10β-triol, for example, estrane-3β,5α,10β,17β-tetrol,
17α-methylestrane-3β,5α,10β,17β-tetrol,
3β,5α,10β-trihydroxy-17α,21-diacetoxy-19-nor-pregnan-20-one,
3β,5α,10β,17α,21-pentahydroxy-19-nor-pregnan-20-one,
3β,5α,10β-trihydroxy-19-nor-pregnan-20-one,
3β,5α,10β-trihydroxy-17α-acetoxy-19-nor-pregnan-20-one,
3β,5α,10β,17α-tetrahydroxy-19-nor-pregnan-20-one,
3β,5α,10β-trihydroxy-16α-methyl-19-nor-pregnan-20-one,
3β,5α,10β-trihydroxy-16α,17α-isopropylidenedioxy-19-nor-pregnan-20-one, and the like.

By subjecting the thus-obtained 3β,5α,10β-triol steroids to the procedure of Example 1 (Part C), there is obtained the 3β,5α,10β - triacetoxy steroid, 3β-hydroxy-5α,10β-diacetoxy steroid, 3-keto-5α,10β-diacetoxy steroid, 3-keto-10β - acetoxy - Δ⁴ steroid and lastly, the 3-keto Δ⁵⁽¹⁰⁾ steroid, for example 3β,5α,10β-17β-tetraacetoxyestrane,
5α,10β,17β-triacetoxyestran-3β-ol,
5α,10β,17β-triacetoxyestran-3-one,
10β,17β-diacetoxyestr-4-en-3-one, and
17β-acetoxyestr-5(10)-en-3-one;
17α-methyl-3β,5α,10β,17β-tetraacetoxyestrane,
17α-methyl-5α,10β,17β-triacetoxyestran-3β-ol,
17α-methyl-5α,10β,17β-triacetoxyestran-3-one,
17α-methyl-10β,17β-diacetoxyestr-4-en-3-one, and
17α-methyl-17β-acetoxyestr-5(10)-en-3-one; and the like.

EXAMPLE 17

A mixture of one gram of a mixture of the 5α,10α-epoxide and 5β,10β-epoxide of 3β-hydroxyestr-5(10)-en-17-one, 15 ml. of methylene chloride and 15 ml. of 5% aqueous acetic acid is stirred and heated for about one hour during which time the methylene chloride is distilled off. The reaction mixture is then allowed to cool, filtered and the solid collected washed with water to give 3β,5α,10β-trihydroxyestran-17-one.

EXAMPLE 18

To a solution of 3 g. of 5α,10β-diacetoxyestrane-3,17-dione in 30 ml. of methanol are added 6 ml. of methyl orthoformate and 0.3 ml. of conc. sulfuric acid. This mixture is refluxed under anhydrous conditions for one hour, cooled to room temperature, and poured into 2% aqueous sodium hydroxide. The resulting mixture is heated under vacuum to eliminate the organic solvents, cooled and extracted with methylene chloride. The methylene chloride extracts are combined, dried, and evaporated to dryness to give 3,17α,17β-trimethoxyestra-1,3,5(10)-triene.

A mixture of the thus-prepared 3,17α,17β-trimethoxy-estra-1,3,5(10)-triene, 25 ml. of acetone, 70 ml. of methanol and 7 ml. of 8% aqueous sulfuric acid is heated at reflux for about 40 minutes. The reaction mixture is then neutralized with saturated aqueous sodium carbonate, concentrated under reduced pressure to about 20 ml. and poured into cold water. The solid which forms is collected by filtration, washed well with water and dried to yield 3-methoxyestra-1,3,5(10)-trien-17-one which can be recrystallized from acetone:hexane.

By using an equivalent amount of other 3-oxo-5α,10β-dihydroxy or 3-oxo-5α,10β-diacetoxy steroids in place of 5α,10β-diacetoxyestrane-3,17-dione as the starting material in the procedure of the first paragraph of this example, other valuable 3-methoxy-1,3,5(10)-triene steroids are obtained, e.g. use of 5α,10β,17β-trihydroxyestran-3-one, 5α,10β,17β-trihydroxy-17α-ethynylestran - 3 - one, 5α,10β-diacetoxy-17β-hydroxy-17α-ethynylestran-3-one, 5α,10β - diacetoxy-19-norpregnane-3,20-dione, and the like as the starting material furnishes 3-methoxyestra-1,3,5(10)-trien-17β-ol, 3-methoxy-17α-ethynylestra-1,3,5(10)-trien - 17β-ol, 3-methoxy-17α-ethynylestra-1,3,5(10)-trien-17β-ol, 3, 20α,20β-trimethoxy-19-nor-pregna-1,3,5(10)-trien and the like.

EXAMPLE 19

A mixture of 3 g. of 5α,10β-diacetoxyestrane-3,17-dione, 20 ml. of dioxane, 10 ml. of water and 0.3 ml. of conc. sulfuric acid is heated at about 50° C. for twenty minutes. The mixture is allowed to cool to room temperature and then is poured into water. After heating under vacuum to remove the organic solvent, the aqueous mixture is cooled and filtered to give 3-hydroxyestra-1,3,5(10)-trien-17-one which can be further purified by recrystallization.

By use of the above process other 3-keto-5α,10β-diacyloxy steroids can be converted into 3-hydroxy-$\Delta^{1,3,5(10)}$ steroids, e.g. use of 5α,10β,17β-tricaetoxyestran-3-one, 17α-methyl-5α,10β,17β-triacetoxyestran-3-one, 17α-ethynyl-5α-10β-diacetoxy-17β-hydroxyestran-3-one, and the like as the starting material in place of 5α,10β-diacetoxyestran-3, 17-dione, furnished 17β-acetoxyestra-1,3,5(10)-trien-3-ol, 17α-methyl-17β-acetoxyestra-1,3,5(10)-trien-3 - ol, 17α-ethynylestra-1,3,5,(10)-triene-3,17β-diol, and the like.

EXAMPLE 20

A mixture of 3 g. of 5α,10β,17β-triacetoxyestran-3-one, 30 ml. of methanol and 0.3 ml. of concentrated sulfuric acid is heated at about 50° C. for twenty minutes. The reaction mixture is then evaporated to dryness under vacuum and the resulting residue is taken up in water and extracted with methylene chloride. The methylene chloride extracts are combined, washed, dried and evaporated to dryness to give 3-methoxyestra-1,3,5(10)-trien-17β-ol 17-acetate which can be further purified by recrystallization, if desired.

By repeating the process of this example using as the starting material other 3-keto-5α,10β-diacyloxy steroids in place of 5α,10β,17β-triacetoxyestran - 3 - one, e.g. 17α-ethynyl-5α,10β-diacetoxy-17β-hydroxyestran-3 - one, 17α-methyl-5α,10β,17β-triacetoxyestran-3-one, 17β - hydroxy-5α,10β-diacetoxyestran-3-one, 5α,10β - diacetoxypregnane-3,20-dione, 5α,10β-diacetoxyestrane-3,17 - dione, and the like, there is obtained 3-methoxy-17α-ethynylestra - 1,3,5-(10)-trien-17β-ol, 3 - methoxy - 17α - methyl-estra-1,3,5 (10)-trien-17β-ol 17-acetate, 3-methoxyestra-1,3,5(10)-trien-17β-ol, 3-methoxy 19-norpregna-1,3,5(10)-trien-20-one, 3-methoxyestra-1,3,5(10)-trien-17-one, and the like.

EXAMPLE 21

A solution of 5 g. of 3β,5α,10β-trihydroxyestran-17-one in 250 ml. of thiophene-free benzene is treated with an equimolar amount of methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to drynes to yield 17α-methyl-estrane-3β,5α,10β,17β-tetrol which is recrystallized from methylene chloride:hexane.

By repeating the above process using other 17-keto steroids as the starting material in place of 3β,5α,10β-trihydroxyestran-17-one, e.g. 3β,5α,10β-triacetoxyestran-17-one, 3β-hydroxy-5α,10β-diacetoxyestran-17one, 3β,5α,10β-trihydroxyestran-17-one 5-acetate, 3β,5α,10β-trihydroxyestran-17-one 10-acetate, and the like, there is obtained 17α-methyl-3β,5α,10β-triacetoxyestran-17β-ol, 17α-methyl-5α,10β-diacetoxyestrane-3β,17β-diol, 17α-methyl-5α - acetoxyestrane-3β,10β,17β-triol, 17α-methyl - 10β - acetoxy estrane-3β,5α,17β-triol, and the like.

Similarly, by using an equivalent amount of vinylmagnesium bromide in place of methylmagnesium bromide in the process of this example, the corresponding 17α-vinyl derivatives are obtained, e.g. 17α-vinylestrane-3β,5α,10β, 17β-tetrol, 17α-vinyl-3β,5α,10β-triacetoxyestran-17β - ol, and the like.

EXAMPLE 22

To a solution of 1 g. of lithium aluminum hydride in 100 ml. of anhydrous tetrahydrofuran is continuously bubbled a slow current of purified acetylene for one hour. Thereafter, 1 g. of 3β,5α,10β-trihydroxyestran-17-one in 10 ml. of tetrahydrofuran is added and the reaction mixture stirred at room temperature for four hours. Eight milliliters of water is then added and the mixture stirred for 30 minutes. The mixture is then filtered and the organic filtrate evaporated to yield 17α-ethynylestrane-3β,5α,10β, 17β-tetrol which is recrystallized from acetone:hexane.

By using other 17-keto steroids in the above process in place of 3β,5α,10β-trihydroxyestran-17-one, e.g. 3β,5α,10β-triacetoxyestran-17-one, 3β-hydroxy-5α,10β - diacetoxyestran-17-one, 3β,10β-dihydroxy-5α-acetoxyestran-17-one, 3β,5α-dihydroxy-10β-acetoxyestran-17-one, and the like, there is obtained 17α-ethynyl-3β,5α,10β-triacetoxyestran-17β-ol, 17α-ethynyl-5α,10β-diacetoxyestrane-3β,17β-diol, 17α-ethynyl-5α-acetoxyestrane - 3β,10β,17β - triol, 17α-ethynyl-10β-acetoxyestrane-3β,5α,17β-triol, and the like.

Alternatively, the process of Example 9 can be used to prepare 17α-ethynyl-17β-hydroxy derivatives from the corresponding 17-keto steroids.

EXAMPLE 23

A mixture of 2 grams of 5α,10β-diacetoxyestrane-3,17-dione, 100 ml. of methanol, 25 ml. of acetic acid, 4 g. of zinc powder and 2 g. of cupric acetate is heated at reflux for about one hour. The reaction mixture is then allowed to cool, filtered, and the solid thus collected washed with methylene chloride. The filtrate and methylene chloride washings are combined and then added to water along with additional methylene chloride. This mixture is separated and the organic phase is washed with water, dried and evaporated to dryness to give estr-4-ene-3,17-dione which can be further purified by recrystallization, if desired.

By repeating the above process using other 3-keto-5α,10β-diacyloxy steroids in place of 5α,10β-diacetoxyestrane - 3,17 - dione, e.g. 17β-hydroxy-5α,10β-diacetoxyestran-3-one, 17α - methyl - 17β - hydroxy - 5α,10β-diacetoxyestran-3-one, 17α - vinyl - 5α,10β,17β - triacetoxyestran-3-one, 17α - ethynyl - 17β - hydroxy - 5α,10β-diacetoxyestran-3-one, 5α,10β - diacetoxy-pregnane-3,20-dione, and the like, there is obtained 17β-hydroxyestr-4-en - 3 - one, 17α-methyl-17β-hydroxyestr-4-en-3-one, 17β-acetoxy - 17α - vinylestr - 4 - en-3-one, 17α-ethynyl-17β-hydroxyestr-4-en-3-one, 19 - nor-pregn-4-ene-3,20-dione, and the like.

EXAMPLE 24

To a solution of 3 g. of 5α,10β-dihydroxyestrane-3,17-dione in 30 ml. of methanol are added 6 ml. of methyl orthoformate and 0.3 ml. of concentrated sulfuric acid. This mixture is refluxed under anhydrous conditions for one hour, cooled to room temperature, and poured into water. The aqueous mixture is heated under vacuum to eliminate the organic solvents, cooled and filtered. The solid thus collected is dried to yield 3-methoxyestra-1,3,5(10)-trien-17-one.

By employing 5α,10β,17β - trihydroxy - 17α - ethynylestran-3-one in the foregoing procedure there is obtained 3-methoxy-17α-ethynylestra-1,3,5(10)-trien-17β-ol.

EXAMPLE 25

To a solution of 5 g. of 3β,5α,10β,17α,21-pentahydroxy-19-nor-pregnan-20-one in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α,20;20,21 - bismethylenedioxy - 19 - nor-pregnane-3β,5α,10β-triol which is recrystallized from methanol: ether.

What is claimed is:

1. A compound selected from the group consisting of those represented by the following formulas A through F:

(A), (B), (C), (D), (E) and (F)

wherein,
R is selected from the group consisting of hydrogen and a lower carboxylic acyl group;
$R^2$ is a low alkyl group;
Ac is a lower carboxylic acyl group; and
Z is the group

[structure with $CH_3$ and $R^1$]

wherein, $R^1$ is selected from the group consisting of oxo and the group

[structure with $OR^4$ and $R^3$]

wherein $R^3$ is selected from the group consisting of hydrogen, lower alkyl, lower alkenyl and lower alkynyl and $R^4$ is selected from the group consisting of hydrogen and a carboxylic acyl group of less than 12 carbon atoms.

2. A compound according to Formula A of claim 1 wherein $R^1$ is oxo.

3. A compound according to Formula A of claim 1 wherein R is hydrogen and $R^1$ is oxo.

4. A compound according to Formula A of claim 1 wherein R is acetyl and $R^1$ is oxo.

5. A compound according to Formula B of claim 1 wherein Ac is acetyl and $R^1$ is oxo.

6. A compound according to Formula C of claim 1 wherein R is hydrogen, $R^1$ is oxo and $R^2$ is methyl.

7. A compound according to Formula C of claim 1 wherein R is acetyl, $R^1$ is oxo and $R^2$ is methyl.

8. A compound according to Formula F of claim 1 wherein Ac is acetyl and $R^1$ is oxo.

9. A compound selected from the group consisting of those represented by the following formulas G through J:

(G), (H), (I) and (J)

wherein
$Z^1$ is selected from the group consisting of

[structure with $CH_3$, $CH_3$, C=O, $R^6$]

wherein $R^6$ is selected from the group consisting of hydrogen, hydroxy and a carboxylic acyloxy group of less than 12 carbon atoms;

[structure with $CH_3$, $CH_2OR^8$, C=O, $OR^7$]

wherein each of $R^7$ and $R^8$ is selected from the group consisting of hydrogen and a carboxylic acyl group of less than 12 carbon atoms;

[structure with $CH_3$, $R^9$]

wherein $R^9$ is a 17α,20,20,21-bis-lower alkylenedioxy group;
R is selected from the group consisting of hydrogen and a lower carboxylic acyl group;
$R^5$ is selected from the group consisting of oxo and the group (α-hydrogen, β-hydroxyl); and
Ac is a lower carboxylic acyl group.

10. A compound according to claim 9 wherein $Z^1$ is

[structure with $CH_3$, $CH_3$, C=O, $R^6$]

wherein $R^6$ is selected from hydrogen, hydroxy and a carboxylic acyloxy group of less than 12 carbon atoms.

11. A compound according to claim 10 wherein $R^6$ is acetoxy.

12. In a process for the production of $\Delta^{5(10)}$ steroids of the 19-norandrostane and 19-norpregnane series which comprises the elimination of a hydroxy substituent or a carboxylic acyloxy substituent at C–6 in a Δ⁵⁽¹⁰⁾ steroid, the improvement which comprises eliminating said hydroxy or acyloxy substituent by treatment with Raney nickel in a monohydric alcohol containing from 2 to 6 carbon atoms.

13. The process according to claim 12 wherein said alcohol is ethanol and the substituent at C–6 is a lower carboxylic acyloxy substituent.

14. The process according to claim 13 wherein said substituent at C–6 is acetoxy and said treatment with Raney nickel is conducted at reflux temperature.

15. The process according to claim 12 wherein said C–6 substituted steroid is 3β,6-dihydroxyestr-5(10)-en-17-one 6-acetate, said alcohol is ethanol, and said treatment with Raney nickel is conducted at reflux temperature.

16. In a process for the production of a 3-keto-19-nor steroid of the 19-norandrostane and 19-norpregnane series which comprises reductively dehydroxylating a 3-keto-Δ⁴ steroid substituted at C–10 with a hydroxy substituent or a lower carboxylic acyloxy substituent, the improvement which comprises treating said 3-keto-Δ⁴ steroid with zinc:copper couple in a reaction medium of an inert organic solvent and acetic acid to obtain the corresponding 3-keto-Δ⁵⁽¹⁰⁾ steroid, said acetic acid being present in the amount of at least 1%, by weight, of said organic solvent.

17. The process according to claim 16 wherein said treatment with zinc:copper couple is conducted at about room temperature.

18. The process according to claim 17 wherein said 3-keto Δ⁴ steroid is a 10-hydroxyestr-4-en-3-one steroid or the 10-acetate thereof and said 3-keto-Δ⁵⁽¹⁰⁾ steroid is an estr-5(10)-en-3-one steroid and said treatment with zinc:copper couple is conducted under an inert atmosphere.

19. The process according to claim 18 wherein said 3-keto-Δ⁴ steroid is 10β-acetoxyestr-4-ene-3,17-dione and said acetic acid is present in an amount of from 1% to about 5%, by weight, of said organic solvent.

20. The process according to claim 18 wherein said 3-keto-Δ⁴ steroid is 10β-hydroxyestr-4-ene-3,17-dione and said acetic acid is present in an amount of at least about 25%, by weight, of said organic solvent.

21. A process for the production of a 3-keto-19-nor steroid of the 19-norandrostane and 19-norpregnane series which comprises treating a 3β-hydroxy-6-lower hydrocarbon carboxylic acyloxy-Δ⁵⁽¹⁰⁾ steroid with Raney nickel in a monohydric alcohol containing from 2 to 6 carbon atoms to obtain a 3β-hydroxy-Δ⁵⁽¹⁰⁾ steroid unsubstituted at C–6; treating said 3β-hydroxy-Δ⁵⁽¹⁰⁾ steroid with peracid in an aqueous acidic medium to obtain a 3β,5α-10β-trihydroxy steroid;

acylating said 3β,5α,10β-trihydroxy steroid with a lower hydrocarbon carboxylic acylating agent to obtain a 3β,5α,10β-triacyloxy steroid; treating said triacylate with alcoholic base to obtain a 3β-hydroxy-5α,10β-diacyloxy steroid; oxidizing said 3β-hydroxy-diacyloxy steroid to obtain a 3-keto-5α,10β-diacyloxy steroid, converting said 3-keto-5α,10β-diacyloxy steroid by treatment with base to a 3-keto-10β-acyloxy-Δ⁴-steroid; and treating said 3-keto-10β-acyloxy-Δ⁴-steroid with zinc:copper couple in a reaction medium of acetic acid and an inert organic solvent to obtain the corresponding 3-keto-Δ⁵⁽¹⁰⁾ steroid, said acetic acid being present in the amount of at least 1%, by weight, of said organic solvent.

22. The process according to claim 21 wherein said 3β-hydroxy-6-lower hydrocarbon carboxylic acyloxy-Δ⁵⁽¹⁰⁾ steroid is treated with Raney nickel in ethanol at about reflux temperature to obtain the corresponding 3β-hydroxy-Δ⁵⁽¹⁰⁾ steroid unsubstituted at C–6; the thus-obtained 3β-hydroxy-Δ⁵⁽¹⁰⁾ steroid is treated with peracetic acid in aqueous acetic acid at a temperature of from about room temperature to about reflux temperature to obtain the corresponding 3β,5α,10β-trihydroxy steroid which is acylated by treatment with acetic anhydride in acetic acid in the presence of perchloric acid at about room temperature to obtain the corresponding 3β,5α,10β-triacetoxy steroid; the thus-obtained 3β,5α,10β-triacetoxy steroid is treated with a methanolic solution of an alkali metal hydroxide at about room temperature to obtain the corresponding 3β-hydroxy-5α,10β-diacetoxy steroid; oxidizing the thus-obtained 3β-hydroxy-5α,10β-diacetoxy steroid by treatment with an alkali metal dichromate and aqueous sulfuric acid in methylene chloride at a temperature of from about 0° C. to about room temperature to obtain the corresponding 3-keto steroid; converting the thus-obtained 3-keto-5α,10β-diacetoxy steroid by treatment with an alkali metal acetate in methanol at about reflux temperature to the corresponding 3-keto-10β-acetoxy-Δ⁴ steroid; and treating said 3-keto-10β-acetoxy-Δ⁴ steroid with zinc:copper couple in a reaction medium of acetic acid and a lower monohydric alcohol at about room temperature under an inert atmosphere to obtain the corresponding 3-keto-Δ⁵⁽¹⁰⁾ steroid.

23. The process according to claim 22 wherein said 3β-hydroxy-6-lower hydrocarbon carboxyl acyloxy-Δ⁵⁽¹⁰⁾ steroid is 3β-hydroxy-6-acetoxyestr-5(10)-en-17-one; said alkali metal hydroxide is potassium hydroxide or sodium hydroxide, said oxidation is conducted with sodium dichromate and aqueous sulfuric acid in methylene chloride at a temperature of about 10° C. to about room temperature; said alkali metal acetate is sodium acetate; said reaction medium of acetic acid and a lower monohydric alcohol is a mixture of glacial acetic acid and methanol containing from about 1% to 5% glacial acetic acid, by weight of said alcohol; and said inert atmosphere is nitrogen.

24. A process for the production of 3-keto-19-nor-Δ⁴ steroids of the 19-norandrostane and 19-norpregnane series which comprises treating a 3-keto-5α,10β-disubstituted steroid selected from a 3-keto-5α,10β-dihydroxy steroid, the 5,10-di-lower hydrocarbon carboxylic acylates thereof or a mixture of the 5-lower hydrocarbon carboxylic acylate and 10-lower hydrocarbon carboxylic acylate thereof with zinc:copper couple in a reaction medium of an inert organic solvent and acetic acid, said acetic acid being present in the amount of at least about 25%, by weight, of said organic solvent, at about reflux temperature.

25. The process according to claim 24 wherein said 3-keto-5α,10β-disubstituted steroid is a 5α,10β-dihydroxy-estran-3-one steroid, the 5,10-diacetate thereof or a mixture of the 5-acetate and 10-acetate thereof.

26. A process for the production of 3-keto-19-nor-Δ⁴ steroids of the 19-norandrostane and 19-norpregnane series which comprises treating a 3-keto-5α,10β-disubstituted steroid selected from a 3-keto-5α,10β-dihydroxy steroid, the 5,10-di-lower hydrocarbon carboxylic acylates thereof or a mixture of the 5-lower hydrocarbon carboxylic acylate and 10-lower hydrocarbon carboxylic acylate thereof with zinc in acetic acid at about reflux temperature.

27. The process according to claim 26 wherein said 3-keto-5α,10β-disubstituted steroid is a 5α,10β-dihydroxy-estran-3-one steroid, the 5,10-diacetate thereof or a mixture of the 5-acetate and 10-acetate thereof.

28. A process for the production of 3-hydroxy-Δ¹,³,⁵⁽¹⁰⁾ steroids of the 19-norandrostane and 19-norpregnane series which comprises treating a 3-keto-5α,10β-di-lower hydrocarbon carboxylic acyloxy steroid with a strong acid in an aqueous water-miscible inert organic solvent at a temperature within the range of about room temperature to about 80° C. for from about 10 minutes to about 30 minutes.

29. The process according to claim 28 wherein said 3-keto-5α,10β-diacyloxy steroid is a 5α,10β-diacetoxy-estran-3-one steroid, said acid is sulfuric acid and said to about 30 minutes.

30. A process for the production of 3-alkoxy-Δ¹,³,⁵⁽¹⁰⁾ steroids of the 19-norandrostane and 19-norpregnane series which comprises treating a 3-keto-5α,10β-di-lower hydrocarbon carboxylic acyloxy steroid with a strong acid in a lower monohydric alcohol at a temperature within the range of about room temperature to about 60° C. process is conducted at a temperature within the range of about 35° C. to about 60° C. for from about 15 minutets for from about 10 minutes to about 30 minutes.

31. The process according to claim 30 wherein said 3-keto-5α,10β-diacyloxy steroid is a 5α,10β-diacetoxyestran-3-one steroid, said acid is sulfuric acid and said alcohol is methanol.

32. A process for the production of 3-keto-10β-hydroxy-Δ⁴ steroids of the 19-norandrostane and 10-nor-pregnane series which comprises treating a 3β-hydroxy-5,10-oxido steroid with an aluminum alkoxide in an inert organic solvent in the presence of a ketone at about reflux temperature.

33. The process according to claim 32 wherein said 3β-hydroxy-5,10-oxido steroid is a 3β-hydroxy-5,10-oxido estrane, said aluminum alkoxide is aluminum ethoxide or aluminum isopropoxide, said ketone is cyclohexanone and said organic solvent is a hydrocarbon solvent.

34. A process for the production of 3-alkoxy-$\Delta^{1,3,5(10)}$ steroids of the 19-norandrostane and 19-norpregnane series which comprises treating a 3-keto-5α,10β-disubstituted steroid selected from a 3-keto-5α,10β-dihydroxy steroid, the 5,10 di-lower hydrocarbon carboxylic acylates thereof or a mixture of the 5-lower hydrocarbon carboxylic acylate and 10-lower hydrocarbon carboxylic acylate thereof with a lower alkyl orthoformate in a lower monohydric alcohol in the presence of an acid catalyst at about reflux temperature.

35. The process according to claim 34 wherein said 3-keto-5α,10β-disubstituted steroid is a 5α,10β-dihydroxy-estran-3-one steroid, the 5,10-diacetate thereof or a mixture of the 5-acetate and 10-acetate thereof, said alkyl orthoformate is methyl orthoformate and said alcohol is methanol.

36. A process for the production of 3-hydroxy-$\Delta^{1,3,5(10),9(11)}$ steroids of the 19-norandrostane and 19-nor-pregnane series which comprises treating a 3-keto-10β-substituted $\Delta^{1,4}$ steroid selected from a 3-keto-10β-hydroxy-$\Delta^{1,4}$ steroid or the 10-lower hydrocarbon carboxylic acylate thereof with a dehydration agent selected from phosphorus oxychloride and thionyl chloride in the presence of pyridine and an inert organic solvent at about reflux temperature.

37. The process according to claim 36 wherein said 3-keto-10β-substituted-$\Delta^{1,4}$ steroid is a 10β-hydroxyestra-1,4-dien-3-one steroid or the 10-acetate thereof, said dehydration agent is phosphorus oxychloride, said inert organic solvent is selected from benzene, toluene, tetrahydrofuran and dioxane, said treatment with said dehydration agent is conducted in the presence of a small amount of pyridine and said 3-hydroxy-$\Delta^{1,3,5(10),9(11)}$ steroid is a 3-hydroxyestra-1,3,5(10),9(11)-tetraene.

References Cited

UNITED STATES PATENTS

| | | | |
|---|---|---|---|
| 2,729,654 | 1/1956 | Colton | 260—397.4 |
| 3,211,760 | 10/1065 | Jeger et al. | 260—397.3 |
| 3,270,007 | 8/1966 | Alvarez | 260—239.55 |
| 3,318,928 | 5/1967 | Anner et al. | 260—397.5 |
| 3,374,229 | 3/1968 | Sasaki | 260—239.55 |

OTHER REFERENCES

Ruelas et al., Journ. Org. Chem., vol. 23, 1958, pp. 1744–1747.

Cross et al., Journ. Org. Chem., vol. 29, 1964, pp. 2195–2200.

Kirdani et al., Journ. Med. Chem., vol. 7, 1964, pp. 592–595.

LEWIS GOTTS, Primary Examiner

E. G. LOVE, Assistant Examiner

U.S. Cl. X.R.

260—239.55, 397.4, 397.5, 397.47, 397.45